United States Patent
Hornung

[11] 3,905,651
[45] Sept. 16, 1975

[54] BRAKE INSTALLATION FOR MOTOR VEHICLES, ESPECIALLY FOR BUSES

[75] Inventor: Walter Hornung, Stuttgart-Bad Cannstatt, Germany

[73] Assignee: Daimler-Benz Aktiengesellschaft, Germany

[22] Filed: Dec. 21, 1973

[21] Appl. No.: 427,310

Related U.S. Application Data

[63] Continuation-in-part of Ser. No. 128,129, March 25, 1971, abandoned, which is a continuation of Ser. No. 842,636, July 17, 1969, abandoned.

[30] Foreign Application Priority Data
July 17, 1968 Germany............................ 1755967

[52] U.S. Cl. .................... 303/2; 303/6.1; 303/13
[51] Int. Cl.² .................. B60T 13/28; B60T 13/68
[58] Field of Search ............... 303/2, 9, 7, 13, 6.1; 188/106 P, 355, 3 R; 137/571, 572, 575; 251/75

[56] References Cited
UNITED STATES PATENTS

| | | | |
|---|---|---|---|
| 2,240,166 | 4/1941 | Stanley | 303/13 |
| 2,275,255 | 3/1942 | Freeman | 188/3 R |
| 2,757,688 | 8/1956 | Klingler | 251/75 |
| 3,445,141 | 5/1969 | Mognet et al | 303/2 |
| 3,456,988 | 7/1969 | Gibbons et al | 303/2 |

Primary Examiner—Trygve M. Blix
Assistant Examiner—Douglas C. Butler
Attorney, Agent, or Firm—Craig & Antonelli

[57] ABSTRACT

A brake installation for motor vehicles of the type having a hydraulic service brake system connected with a compressed-air amplifier for controlling the service brakes. Two separate compressed-air circuits are provided for supplying compressed air to the amplifier. The two circuits are selectively connected with the amplifier by way of a two way valve arranged immediately upstream of the amplifier. The first braking circuit supplies compressed air during braking of the vehicle under normal driving conditions and includes a pedal-actuable valve for controlling the supply of compressed air to the two way valve. The second braking circuit is utilized for supplying compressed air during conditions when the vehicle is stopped so that the service brakes act as a stop brake. This second circuit includes a stop brake valve which is connected with the two way valve so as to automatically communicate the second circuit with the amplifier upon the opening of the stop brake valve, irrespective of the condition of the pedal-actuated valve. In one preferred embodiment, the stop brake valve is a simple manually controllable on-off valve which includes a device for retaining itself in the respective open and closed positions without the need for driver attention so that a bus driver can merely open the stop brake valve and then be free to handle passenger transfer tickets, etc., while the vehicle is safely held in the stopped condition. Another preferred embodiment includes an electro-magnet operated stop valve which is connected with the vehicle doors so as to automatically move to the open position with an open door and to the closed position with a closed door.

15 Claims, 2 Drawing Figures

PATENTED SEP 16 1975    3,905,651

WALTER HORNUNG, INVENTOR

BY Craig, Antonelli, Stewart & Hill
ATTORNEYS

BRAKE INSTALLATION FOR MOTOR VEHICLES, ESPECIALLY FOR BUSES

BACKGROUND AND SUMMARY OF THE INVENTION

This application is a Continuation-in-Part of my copending application Ser. No. 128,129, filed Mar. 25, 1971, now abandoned, which copending application is a Continuation application of my earlier application Ser. No. 842,636, filed July 17, 1969 now abandoned.

The present invention relates to a brake installation for motor vehicles, especially for use with passenger buses of the type which include a hydraulic service brake system that is controlled by a compressed-air amplifier. In these type of brake systems, a pedal-actuated control valve is arranged in the compressed air supply circuit for controlling supply of compressed-air to the amplifier, which in turn controls the actuation of the hydraulic service brakes. More particularly, the present invention is directed to an improved holding or stop brake for vehicles having a brake system of this type.

In passenger buses, it is advantageous to have a stop or holding brake to protect the bus from unintended movement at a bus stop, without it being necessary for the driver to keep the brake in the activated position constantly with one foot or by hand. This type of stop brake is to be applied only when the vehicle has come to a standstill and should be constructed so that it maintains its stopped position until intentionally released by the driver. The driver of the bus can then simply engage the stop brake after the bus has come to a stop, and then safely proceed to his other necessary tasks at the bus stop, such as the issue of transfers, making change, etc. Once the driver has completed these other tasks and the passengers are in position so that the vehicle can be safely moved, the stop brake is to be released. In the interest of economy of brake construction, it is desirable that the operating or service brakes be also usable in conjunction with the stop brake. An automatic holding or stop brake has been contemplated for wheel-brakes actuated by compressed-air acting directly on the diaphragm cylinders of the operating or service brake of buses.

The present invention contemplates providing an automatic stop or holding brake for vehicles with hydraulic wheel-brakes. More specifically, the present invention contemplates a brake installation of the above-mentioned type, including hydraulic service brakes connected to a compressed-air amplifier, with the further provision of a separate compressed-air supply circuit arranged separate of the compressed-air supply circuit and upstream of the compressed-air amplifier, which separate circuit acts to supply compressed-air for holding the vehicle in a stopped condition. A two way valve is arranged immediately upstream of the compressed-air amplifier for selectively connecting the service brake compressed air supply circuit or the stop brake compressed-air supply circuit. This two way valve is operatively connected to the actuation of a stop brake valve arranged in the stop brake circuit so as to automatically communicate the stop brake circuit and block out the service brake circuit whenever the stop brake valve is moved to an open position.

With the arrangement of the stop brake circuit according to the present invention, the economies of utilizing the compressed-air amplifier and hydraulic service brakes for the holding brake system are obtained. Also, since the stop brake circuit will be utilized almost exclusively when the vehicle is running, when the bus is stopped at a bus stop or the like, a continuous supply of compressed-air to the stop brake circuit by way of a compressor driven by the propelling engine of the vehicle is assured. In this connection, it is noted that the stop brake according to the present invention is different than the parking brake normally required additionally in every vehicle. The parking brake, which must not be dependent on units driven by the vehicle, such as a compressed-air generator, so that it can also be applied with the engine turned off, is generally so cumbersome in its operation for this reason that it cannot be employed as a practical brake for bus stops. On the other hand, the stop brake according to the present invention can advantageously utilize the servo-means (including vehicle engine operated compressed-air generator and electrical control circuits) to facilitate its actuation. Since the stop brake according to the present invention is primarily usable only when the engine is turned on, its primary function is to act as a stop brake and not as a parking brake. In this connection, the stop brake circuit of the present invention can advantageously include a compressed-air tank reservoir so as to maintain compressed air supply for reasonable periods when the engine is not running, however the primary source of compressed-air for the stop brake circuit contemplated by the present invention is the arrangement with compressed-air supply by way of an engine driven compressor in use of the vehicle.

Since the stop brake according to the present invention is to be actuated primarily only when the vehicle is already in a stopped condition, a very simple control of the compressed air in the stop brake compressed-air circuit is necessary, since one only has to assure that a sufficient amount of compressed air is supplied to maintain the vehicle in the stopped condition, without being concerned with the changing reaction forces at the wheels of the vehicle, as is required with a service brake for use during driving of the vehicle. For this reason, the present invention contemplates utilizing a simple on-off valve in the brake compressed-air circuit. The present invention also contemplates providing an adjustable throttle valve in the brake circuit for accommodating adjustments of the total amount of compressed-air communicated through the brake circuit with an open stop brake valve. This throttle valve can then be set so as to assure sufficient brake force for the maximum expected braking force needed by the stop brake to hold the vehicle in position. For example, the throttle valve could be preset for a particular bus route so as to accommodate the steepest incline at which the bus is required to stop and permit boarding and unboarding of passengers.

A structurally advantageous preferred embodiment of the present invention includes a first compressed-air tank supplied by an air compressor, which first tank includes a first outlet leading directly to the pedal-actuated valve of the service brake circuit and a second outlet leading to a second compressed-air tank. The second compressed-air tank has an outlet which leads to the stop brake valve of the stop brake circuit. The controls for the stop brake valve are preferably accommodated within the area of the steering wheel of the vehicle so as to be readily accessible by the driver. The inclusion of the second compressed-air tank further enhances the safety of the stop brake circuit by assuring a compressed-air supply even with a failure of the circuit for the service brake, at least for short periods of time. A one way check valve is preferably arranged between the first and second compressed-air tank so as to effectively prevent a backflow of air from the stop brake circuit into the service brake circuit in the event of failure of the service brake circuit.

As indicated above, a preferred embodiment of the present invention utilizes a manually controllable stop brake valve which the driver can merely move into the open position with a stopped vehicle. and then attend to passenger transfers, etc. without fear of movement of the vehicle and without the need for any further manual engagement of the stop brake. In another preferred embodiment of the invention, the stop brake valve is constructed as an electromagnetic valve which is actuable by a path-dependent control device arranged at a door of the vehicle so that the stop brake is automatically controlled in dependence on the opening and closing movement of the door. A bus-stop-brake is produced thereby which is automatically engaged with the opening of the door and is automatically released with the closing of the doors.

Accordingly, it is an object of the present invention to provide an automatic stop or holding brake for vehicles of the type having hydraulic wheel-brakes and which obviates by extremely simple and operationally reliable means the aforementioned shortcomings and drawbacks encountered in the prior art.

Another object of the present invention resides in providing a holding or stop brake, especially for buses, which is simple in construction and operates fully automatically to engage the stop brake upon opening of a door and releases the stop brake upon closing of a door.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
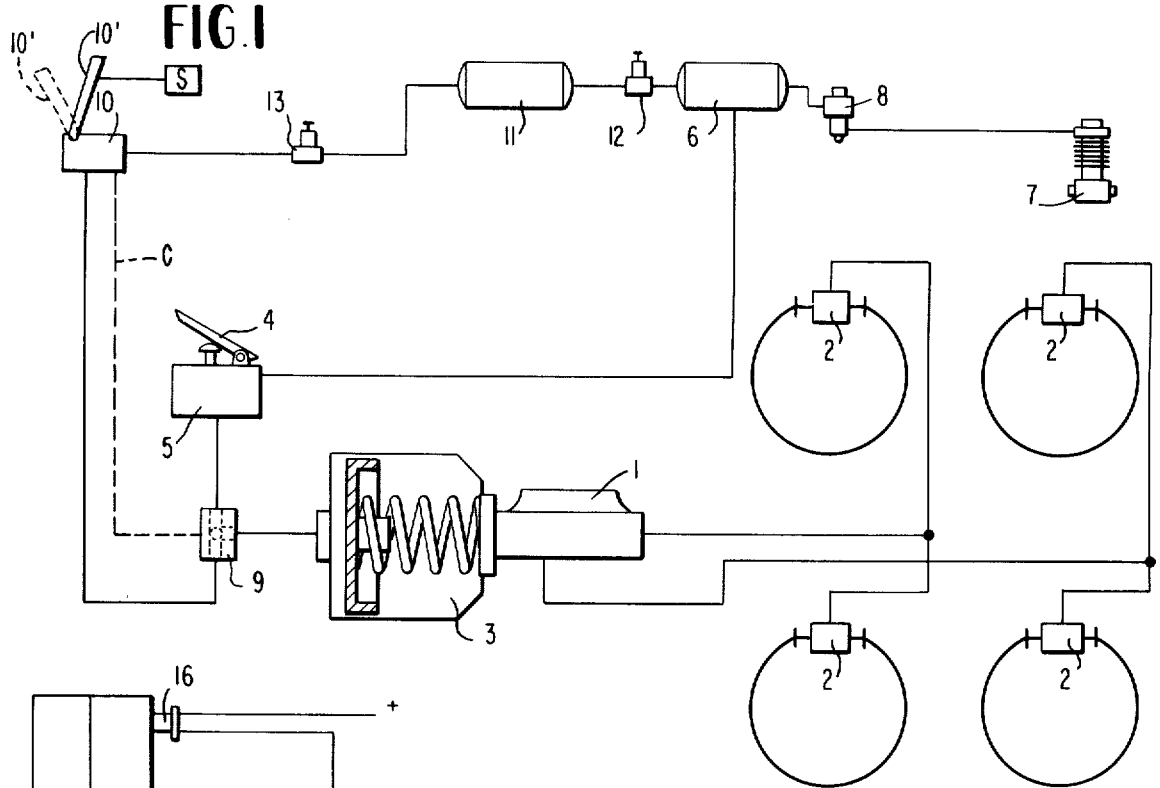
FIG. 1 is a schematic view of a brake arrangement including an automatic stop brake constructed in accordance with the present invention.

Referring now to the drawings, wherein like reference numerals are used throughout the two views to designate like parts, and more particularly to FIG. 1, the hydraulic wheel-brake installation schematically illustrated in this Figure essentially consists of a hydraulic tandem cylinder 1 (or of any other conventional master brake cylinder) by means of which the individual wheel brake cylinders 2 of the front and rear wheels are supplied with pressure-oil. The actuation of the master brake cylinder 1 takes place by way of a compressed air amplifier or servo means 3, to which compressed air is adapted to be fed from a compressed-air tank 6 by way of a brake valve 5 actuated by a pedal 4. The pedal-actuated brake valve 5 is constructed so as to provide control of the compressed air supply over a range of braking pressures, so as to accommodate use of the service brake system during driving of the vehicle with the experienced different braking pressures required. The compressed-air storage tank 6 is charged or fed with compressed-air from an air-compressor 7 by way of a conventional pressure regulator 8. The tank 6, valve 5, and two way valve 9 constitute a service brake compressed-air supply circuit for supplying the amplifier 3 during normal driving conditions. That is, the valve 9 will be in a position connecting valve 5 to amplifier 3 during normal driving conditions.

A second compressed-air storage tank 11 is arranged downstream of a second outlet of the tank 6. An overflow valve 12 is arranged between the two tanks 6 and 11, which valve 12 is a simple check valve admitting only a flow in the direction from tank 6 to container 11 and opening only at a preselected pressure, thus permitting this flow direction. Downstream of compressed-air storage tank 11, an adjustable throttle valve 13 is arranged. Downstream of this throttle valve 13, a stop-brake valve 10 is arranged. This valve 10 is a simple on-off straight-pattern valve which is movable between respective open and closed positions, as schematically depicted by the solid and dashed line positions of handle 10'. The tank 11 and the valves 13, 10 and 9 constitute a stop brake compressed-air supply circuit for supplying compressed-air to amplifier 3 during stop brake operation. Reference letter C schematically depicts a control connection between stop brake valve 10 and two way valve 9. In operation, whenever valve 10 is in the open position, valve 9 is switched to a position communicating the output of valve 10 to the amplifier 3 and blocking the communication of the output of valve 5 with respect to amplifier 3. In this condition, the amplifier 3 is actuated by the compressed air in the stop brake circuit 11, 13, 10, 9 so that the service brakes operate as stop or holding brakes. Whenever valve 10 is in the closed position, valve 9 is switched to a position blocking the output of valve 10 with respect to amplifier 3 and communicating the output of valve 5 with respect to the amplifier 3 so that the installation operates with service brake circuit 6, 5, 9 controlling the supply of compressed air to amplifier 3. The control connection C between valve 10 and valve 9 can be a mechanical linkage or an electro-mechanical linkage with an electric signal supplied to a solenoid arrangement for moving valve 9 in response to the respective position of valve 10.

Throttle valve 13 accommodates adjustment of the compressed-air quantity and pressure supplied by way of the brake circuit. Since the stop brake circuit is operated substantially only when the vehicle is in a stopped condition, a precise continuous control of the compressed air supply in the brake circuit is not needed. However, this throttle valve 13 is advantageous for facilitating adjustment of the total supply in the brake circuit so as to accommodate for the maximum expected usage of the stop brake circuit on a particular vehicle. For example, the throttle valve 13 could be adjusted so as to provide sufficient stop or holding brake forces at the steepest inclination of the vehicle in the various bus stops experienced on a given route.

Figure 2:
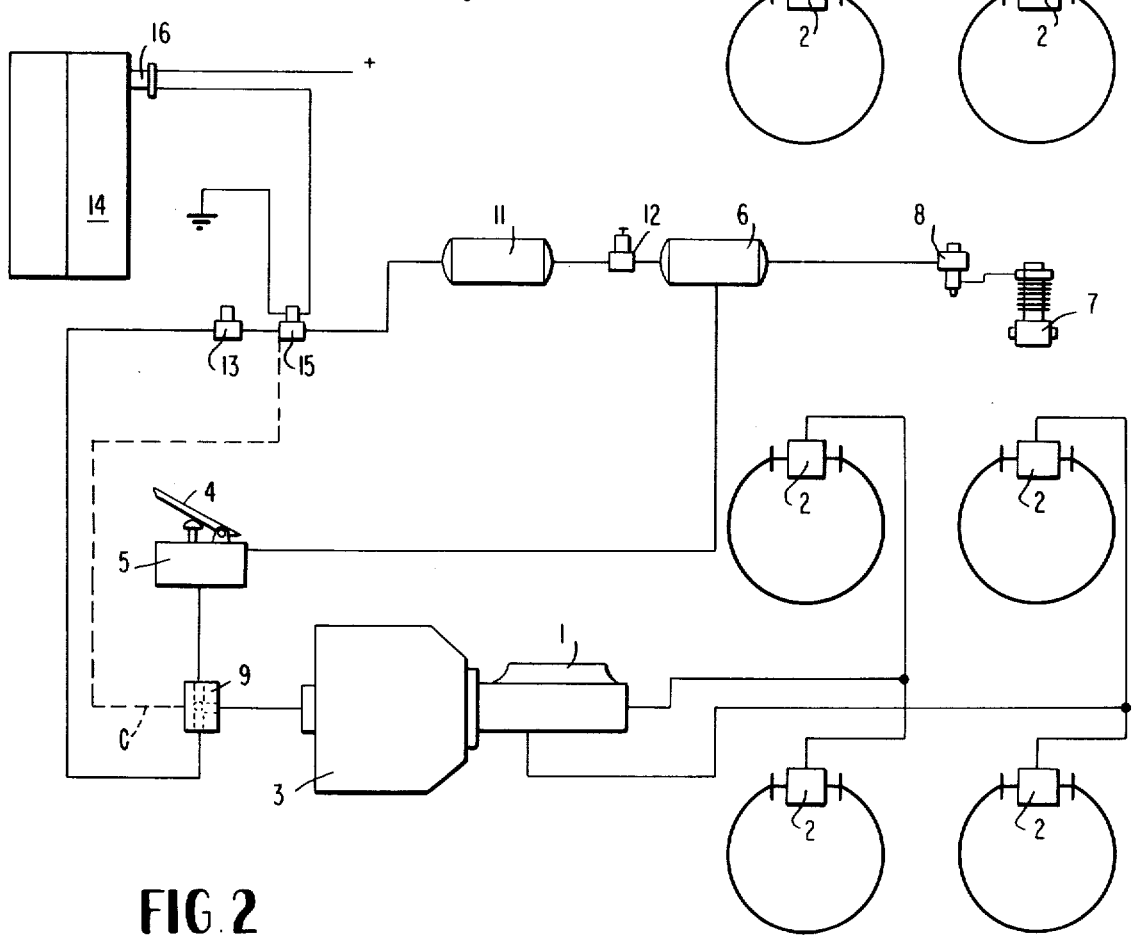
FIG. 2 is a schematic view of a modified embodiment of a brake installation constructed in accordance with the present invention.

FIG. 2 illustrated another preferred embodiment of a brake installation construction in accordance with the present invention. In FIG. 2, like reference numerals are used to designate similar structures as in FIG. 1. The FIG. 2 brake installation is similar to the installation of FIG. 1, except that, in place of the manual stop brake valve 10 of FIG. 1, an electro-magnetic valve 15 is provided. The electro-magnetic stop brake valve 15 is actuated by way of a path dependent control device 16 that is arranged at the door 14 of the bus so that the valve 15 is opened during opening of the door 14 and closed during the closing of the door 14. As in FIG. 1, a control installation C operatively interconnects the valves 15 and 9 so as to communicate the brake circuit with the amplifier 3 with an opened valve 15 and so as to communicate the service brake circuit with the amplifier 3 with a closed valve 15. As in the FIG. 1 embodiment, this valve 15 need only be a simple on-off valve, since, with a stopped vehicle, the stop brake circuit nedd not have continuous fine adjustments to accommodate changing braking reaction forces at the vehicle wheels.

Since each of the valves 9, 10, 12, 13 to be used in conjunction with the present invention are of conventional construction, the details thereof have not been included herein. One skilled in the art, given the present disclosure, will be able to obtain and select the appropriate valves to be used in the brake installation described herein. U.S. Pat. No. 2,870,779 discloses a one way check valve of the type generally contemplated for use as valve 12 in the brake installation of the present invention. For the throttle valve 13, constructions of the type disclosed in U.S. Pat. Nos. 2,980,392 and 3,198,479 could be utilized. For the two way valve 9, an arrangement such as in U.S. Pat. Nos. 1,271,143 or 2,757,688 could be utilized, with the last-mentioned patent including solenoid means which could be operationally connected to the control installation C of the brake installation of the present invention. The valve 10, as discussed above can be a simple on-off valve, with provisions for maintaining the handle 10' in the selected open or closed position without necessitating continual holding thereof. For example, the handle 10' could be spring biased by schematically depicted spring 5 into each of the respective positions with a switching of the biasing forces upon movement in either direction beyond a dead-center position.

The present invention is not intended to be limited to the illustrated embodiments. Thus, it is contemplated within the scope of the present invention, to provide a single-stage master cylinder or a tandem master cylinder which utilize for the operating or service brake, a two-stage-pedal-type brake-valve with two single-chamber prestressed piston-cylinders, and with two hydraulic master cylinders. Furthermore, it is also contemplated to utilize the present invention with the provision of a single chamber brake amplifier or a two-stage brake amplifier which is actuated by way of a conventional pedal.

It is further noted that each of valves 10, 15 and 5 are provided with appropriate relief or venting arrangements so as to accommodate release of the compressed-air supply for releasing the brake system when the valves are switched from the open to the closed positions.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

To further aid in the disclosure of the present invention, the complete disclosure of the above-mentioned parent application Ser. No. 128,129 is incorporated by reference herein.

I claim:

1. A brake installation for motor vehicles comprising:

first compressed-air tank means having an air inlet and first and second air outlets, air-compressor means connected to the air inlet of said first tank means, hydraulic service brake means, compressed-air amplifier means arranged upstream of said service brake means for controlling actuation of said service brake means, a first braking air supply circuit, a second braking air supply circuit, a two way valve means arranged immediately upstream of said compressed-air amplifier means; said two way valve means having a single valve outlet leading to said compressed air amplifier means, a first valve inlet connected to said first braking air supply circuit, and a second valve inlet connected to said second braking air supply circuit; said two way valve means being movable between a first valve position with said first braking circuit communicated with said compressed-air amplifier means and said second braking circuit out of communication with said compressed-air amplifier means and a second valve position with said second braking circuit communicating with said compressed-air amplifier means and said first braking circuit out of communication with said compressed-air amplifier means, said first and second braking air supply circuits being independent from one another and being communicated with the respective first and second air outlets of said first tank means such that flow of air in one of said circuits is substantially unaffected by flow of air in the other of said circuits, driving brake control means for controlling the supply of compressed air to said two way valve means by way of said first braking circuit for accommodating service brake control during normal driving with said two way valve means in said first position, and stop brake control means for controlling the supply of compressed-air to said amplifier means from said second braking circuit, said stop brake control means including a stop brake valve movable between a closed position blocking flow of compressed-air through said second braking circuit to said two way valve means and an open position communicating compressed-air to said two way valve means by way of said second braking circuit and switching means for switching said two way valve means to said second position whenever said stop brake valve is in said open position and for switching said two way valve means to said first position whenever said brake valve is in said open position.

2. An installation according to claim 1, wherein said second braking air supply circuit includes a second compressed-air tank means connected to said second air outlet of said first tank means by way of a relief valve means, and wherein said stop brake valve is arranged downstream of said second compressed-air tank means.

3. An installation according to claim 2, wherein said stop brake valve includes means for selectively communicating said second tank means with the two way valve means.

4. An installation according to claim 3, wherein a throttle valve is arranged immediately downstream of said second tank means for controlling the amount of air supplied to the stop brake valve.

5. An installation according to claim 4, wherein a pressure regulator means is arranged between said air-compressor means and said first tank means.

6. An installation according to claim 1, wherein said stop brake valve is located in the vicinity of the steering wheel of the vehicle.

7. An installation according to claim 1, wherein said stop brake valve is a manually operable on-off valve, and wherein means are provided for automatically maintaining said on-off valve in an open position so that the stop brake remains effective without requiring continued attention by the vehicle driver.

8. An installation according to claim 1, wherein means are provided for automatically moving said stop brake valve to said open position in response to the opening of a vehicle door and for automatically moving said stop brake valve to said closed position in response to closing of said vehicle door.

9. An installation according to claim 8, wherein said stop brake valve is an electro-magnet operated valve, and wherein said last-mentioned means includes means for controlling supply of electricity to said electro-magnet operated valve in response to the position of said vehicle door.

10. An installation according to claim 1, wherein said driving brake control means includes a pedal actuated brake valve in said first braking circuit which accommodates continuous variation of the air pressure communicated by said first braking circuit as a function of the position of a pedal attached to said pedal actuated brake valve.

11. An installation according to claim 10, wherein said stop brake valve is a simple on-off valve which permits passage of all air supplied thereto when in said open position and which blocks passage of all air supplied thereto when in said closed position.

12. An installation according to claim 11, wherein a throttle valve is arranged immediately upstream of said stop brake valve for controlling the amount of air supplied to said stop brake valve.

13. An installation according to claim 12, wherein said throttle valve is adjustable so that the supply of air pressure to said stop brake valve may be varied in dependence upon predetermined minimum air pressures required for holding the vehicle in a stopped position during use of the vehicle over a given travel path with predetermined inclination of the vehicle during stops thereof.

14. An installation according to claim 11, wherein said air compressor means is powered by an engine which also propels said vehicle.

15. An installation according to claim 1, wherein said stop brake valve is a simple on-off valve which permits passage of all air supplied thereto when in said open position and which blocks passage of all air supplied thereto when in said closed position.

* * * * *